United States Patent Office 3,409,544
Patented Nov. 5, 1968

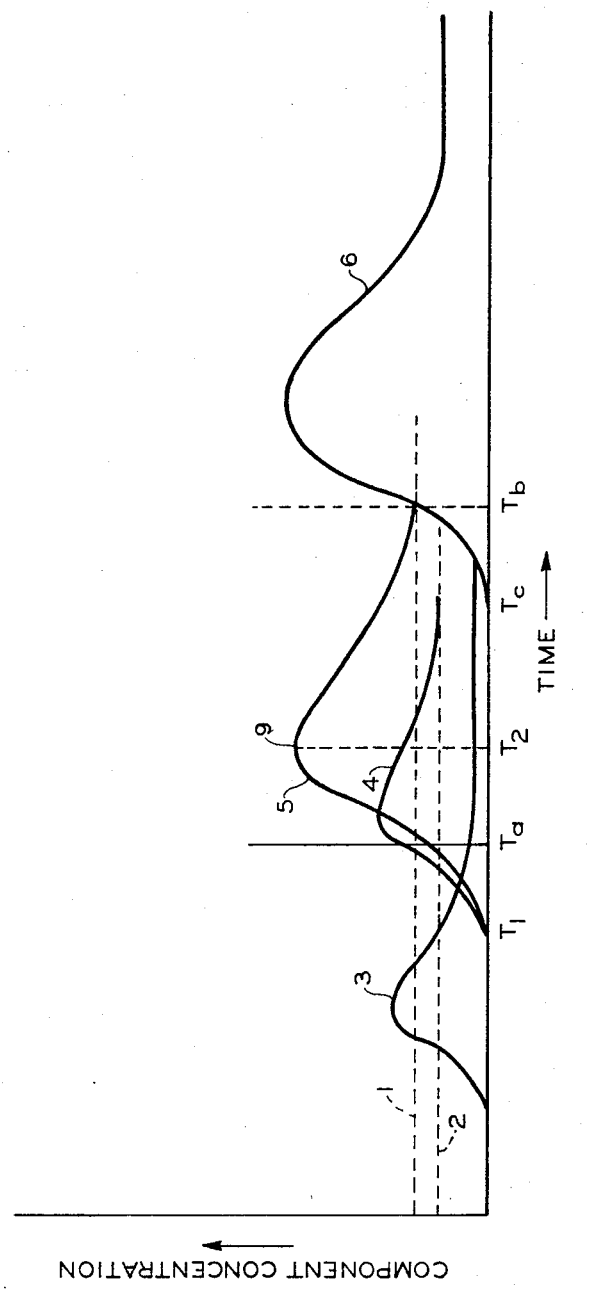

3,409,544
HYDROCARBON SEPARATION USING TWO
ADSORPTION ZONES
John E. Cottle, Bartlesville, Okla., assignor to Phillips
Petroleum Company, a corporation of Delaware
Filed Sept. 15, 1966, Ser. No. 579,600
1 Claim. (Cl. 208—310)

ABSTRACT OF THE DISCLOSURE

A relatively wide boiling range hydrocarbon mixture is subjected to adsorption in a first zone and a predetermined fraction having a relatively narrow boiling range is isolated therefrom by directing the adsorber effluent to a second adsorption zone during the period in which the desired fraction is predominant in the effluent from the first adsorption zone.

---

This invention relates to the separation of hydrocarbon mixtures. In one aspect hydrocarbons are separated by sequential series adsorption. In another aspect a predetermined hydrocarbon fraction is isolated from a hydrocarbon mixture in sequentially operated series adsorption zones. In another aspect of this invention a narrow boiling range fraction is isolated from a wide boiling range fraction by passing the effluent from a first adsorption zone receiving said mixture to a second adsorption zone during the period in which the desired fraction is predominant.

The separation of crude hydrocarbon fractions to effect the isolation of narrow boiling range fractions to provide the desired feeds for subsequent processing is a necessary refining operation requiring considerable expense in initial investment and operating costs. Numerous methods of accomplishing such separations have been devised for serving numerous demands. However, due to the expense of these operations and the advantages of providing high purity feeds for subsequent processing operations, there is a continuing need for separating and purifying various hydrocarbon mixtures and the fractions thereof.

It is, therefore, one object of this invention to provide a method for separating hydrocarbons. It is another object of this invention to provide a method to separate a fraction of predetermined boiling range from a wide boiling range hydrocarbon mixture. It is another object of this invention to increase the efficiency of hydrocarbon adsorption apparatus. It is a further object of this invention to reduce the requirements of regenerating hydrocarbon adsorption apparatus.

Other objects, aspects and advantages of this invention will be apparent to one skilled in the art in view of the following disclosure and the drawings and the appended claims to this invention.

In accordance with one embodiment of this invention a relatively wide boiling range hydrocarbon mixture is subjected to adsorption in a first zone and a predetermined fraction having a relatively narrow boiling range is isolated therefrom by directing the adsorber effluent to a second adsorption zone during the period in which the desired fraction is predominant in the effluent from the first adsorption zone. The effluent removed from the first adsorption zone before and after this critical period can be vented or directed to additional accumulation or processing facilities. Following the completion of the adsorption of the desired fraction in the second adsorption zone, the desired fraction is removed by purging or backwashing the second zone and can be further purified or processed as desired.

This method of hydrocarbon fraction isolation enables more effective utilization of adsorption apparatus particularly with respect in the requirements of regenerating the adsorbing medium. When the desired hydrocarbon fraction is isolated by the process of this invention, the second adsorption zone is not contaminated with any appreciable amounts of hydrocarbon fractions other than the fraction to be isolated in that particular zone. Therefore, where it is desired to remove, for example, a butanes fraction from a hydrocarbon mixture, one adsorption zone can be designated for that purpose with the result that only a small amount of material other than the $C_4$ hydrocarbons is allowed to come in contact with the butane adsorbent.

The process of this invention can be better understood by reference to the drawing which illustrates the manner in which the first adsorber effluent composition (ordinate) varies with time (abscissa). Broken lines 1 and 2 represent the concentrations of n-butane and isobutane in the feed to the first adsorber, respectively. Solid lines 3, 4, 5 and 6 represent the manner in which the concentration of ethane, isobutane, n-butane, and isopentane, respectively, vary with time. This illustration is, however, only representative of a part of the spectrum that would result from the use of the hydrocarbon mixture containing higher boiling constituents. The presence of these materials in the first adsorber effluent would not become apparent until some later time not illustrated in the drawing.

The several different hydrocarbons present in the relatively wide boiling range hydrocarbon mixture feed to the first adsorber are selectively deterred by the prevailing adsorption-desorption mechanisms depending on the affinity of the adsorbent substrate for each species of the hydrocarbon mixture. Usually, the adsorbent will have a higher effective affinity for the higher molecular weight fractions. As a result the lower boiling constituents will be emitted from the first adsorption zone before the higher boiling constituents. The concentration in the effluent of any particular constituent, for example, normal butane, will rise rather rapidly from a negligible concentration at $T_1$ to a maximum concentration 9 at $T_2$ and then gradually decline to the concentration of that particular constituent, i.e., normal butane in the feed of the adsorber as indicated by broken line 1. Depending on the adsorbent medium and operating conditions such as fluid velocity and temperature, the times at which each constituent is emitted from the adsorption zone and the maximum concentration realized can be varied as desired.

Where it is desired to isolate a butanes fraction from a hydrocarbon mixture comprising several different hydrocarbons, the effluent from the first adsorption zone will be directed to the second adsorption zone only during the period between $T_a$ and $T_b$ which is the period during which the butanes concentration in the first adsorber effluent exceeds the butanes concentration in the feed to the first adsorber. However, this time span is only illustrative of one conceivable mode of operation and can obviously be varied considerably within these limits. For example, where it is desired to exclude any appreciable amount of pentanes from the isolated fraction, the effluent from the first adsorber should be directed to the second adsorption zone only during the period between $T_a$ and $T_c$, the latter time being the point at which the concentration of pentanes in the first adsorber effluent begins to become significant.

Numerous fractions within the same hydrocarbon mixture can be isolated by this technique using one primary adsorption zone and a number of secondary adsorption zones depending on the number of fractions desired. For example, if it is desired to isolate pentanes as well as butanes, the effluent from the first adsorption zone could be directed to a third adsorption zone at time $T_b$ and during the period in which pentanes are predominant in the effluent. The same procedure can be followed to isolate higher boiling fractions as well as methane and ethane.

When the desired fractions have been isolated, the feed can be diverted from the expended primary adsorption zone and directed to a fresh adsorption zone after which the above described procedure is repeated. The secondary adsorption zone utilized to isolate the several desired fractions can be purged by heating to vaporize the adsorbed hydrocarbons. The several adsorbers can also be flushed with purged gas to expedite removal of the fractions contained therein.

As a result of this procedure, the secondary adsorption zones are never contaminated with appreciable amounts of higher boiling materials, thereby avoiding contamination of the adsorption zones designated for each particular hydrocarbon fraction.

In an alternate embodiment, several primary adsorption zones can be in operation at all times and the effluents from each passed sequentially to one or more secondary adsorption zones designated for the isolation of one predetermined constituent.

The hydrocarbon mixtures fed to the first adsorption zone can comprise hydrocarbons having from about 1 to about 12 carbon atoms. Such hydrocarbons can be saturated or unsaturated, acyclic, cyclic, or aromatic hydrocarbons. Operating temperatures of the several columns will, of course, depend on the composition of the hydrocarbon mixture and the boiling points of the hydrocarbon fractions to be isolated and the degree of resolution desired. Normally, however, the preferred operating temperatures will be within a range of from about 50 to about 150° F. and fluid velocity will be within a range of from about 200 to about 2000 v./v/hr.

Adsorbents which are suitable for application within the concept of this invention are essentially any solid materials which will adsorb and desorb hydrocarbons. Suitable adsorbents are, for example, activated carbon, charcoal, silica gel, activated alumina, molecular sieves, etc.

EXAMPLE

A hydrocarbon mixture having a normal boiling point range of from −259 to 97° F. and containing hydrocarbons having from 1 to 5 carbon atoms was contacted in a first adsorption zone packed with activated carbon at a temperature of 80° F., pressure of 300 p.s.i.g. and at a rate of 600 v./v./hr. After 60 minutes, the effluent was introduced to a second adsorption zone packed with activated carbon adsorbent and operated at a temperature of 80° F. and a fluid velocity of 600 v./v./hr. for a period of 60 minutes after which flow was cut out of the second column. The second column was then purged with nitrogen at a temperature of 500° F. and the hydrocarbon fraction was recovered and analyzed with the following results:

| | Mol. percent |
|---|---|
| $C_3$ | 4 |
| $iC_4$ | 36 |
| $NC_4$ | 55 |
| $iC_5$ | 2 |
| $NC_5$ | 3 |
| | 100 |

This operation resulted in a 2-fold increase in butanes concentration as compared to the feed to the first adsorption zone. Recovery of butanes was 95+ percent based on feed to the first adsorption zone during the period in which effluent was directed to the second adsorption zone.

Numerous variations and modifications of the concept of this invention will be apparent to one skilled in the art in view of the foregoing disclosure, the drawing and the appended claim to this invention, the essence of which is that there is provided a method for receiving relatively narrow boiling range hydrocarbon fractions from relatively wide boiling range hydrocarbon mixtures by passing the mixtures to a first adsorption zone and directing the effluent from the first zone to a second adsorption zone during a predetermined period.

I claim:

1. A method for separating and recovering a narrow boiling range hydrocarbon fraction from a relatively wide hydrocarbon mixture comprising hydrocarbons having from 1 to 12 carbon atoms, said narrow boiling range hydrocarbon fraction having a boiling point intermediate the boiling point range of said relatively wide boiling range hydrocarbon mixture and comprising primarily hydrocarbons having the same number of carbon atoms, which method comprises continuously contacting said mixture with adsorbent in a first zone at conditions such that said fraction is concentrated in said first zone and exits said first zone during a predetermined period, passing the effluent from said first zone into contact with adsorbent in a second zone during said predetermined period in which the concentration of said fraction in said effluent exceeds the concentration of said fraction in the said hydrocarbon mixture to adsorb said fraction in said second zone while continuing to adsorb hydrocarbons boiling higher than said fraction in said first zone, diverting said effluent from said second zone at the end of said predetermined period, and recovering said fraction from said second zone.

References Cited

UNITED STATES PATENTS

| 2,632,726 | 3/1953 | Ringham et al. | 208—310 |
| 2,987,471 | 6/1961 | Eggertsen | 208—310 |
| 3,109,722 | 11/1963 | Dow | 55—76 |
| 3,184,518 | 5/1965 | Sanders et al. | 208—310 |
| 3,260,667 | 7/1966 | Yeo et al. | 208—310 |
| 3,281,353 | 10/1966 | Yeo et al. | 208—310 |

DELBERT E. GANTZ, *Primary Examiner.*

H. LEVINE, *Assistant Examiner.*